US008816706B1

(12) United States Patent
Ward et al.

(10) Patent No.: US 8,816,706 B1
(45) Date of Patent: Aug. 26, 2014

(54) RECONFIGURABLE DEVICES CONTAINING CARBON NANOMATERIALS AND METHODS FOR USING SAME

(75) Inventors: Jonathan W. Ward, Fairfax, VA (US); Brent M. Segal, Woburn, MA (US); Elwood J. Egerton, Longmont, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 487 days.

(21) Appl. No.: 13/220,592

(22) Filed: Aug. 29, 2011

Related U.S. Application Data (60) Provisional application No. 61/378,073, filed on Aug. 30, 2010.

(51) Int. Cl.
*G01R 27/26* (2006.01)
*G01N 27/00* (2006.01)

(52) U.S. Cl.
USPC .......................... 324/693; 324/667; 324/71.1

(58) Field of Classification Search
USPC ......................... 324/693, 71.1, 667
See application file for complete search history.

(56) References Cited

U.S. PATENT DOCUMENTS

| 7,780,918 B2 | 8/2010 | Segal et al. |
| 7,786,540 B2 | 8/2010 | Segal et al. |
| 2010/0072042 A1* | 3/2010 | Bertin et al. ................. 200/181 |
| 2010/0327247 A1 | 12/2010 | Ward et al. |
| 2010/0329966 A1* | 12/2010 | Fugetsu ..................... 423/447.1 |

* cited by examiner

*Primary Examiner* — Vincent Q Nguyen
(74) *Attorney, Agent, or Firm* — McDermott Will & Emery LLP (57) ABSTRACT

Methods for using carbon nanomaterials to alter the operational output of a device are described herein. The methods can include providing a device that contains a carbon nanomaterial in a first state, and applying an input stimulus to the carbon nanomaterial so as to change the first state into a second state. In the first state, the carbon nanomaterial can be used to produce a normal operational output of the device, whereas the device can produce an altered operational output when the carbon nanomaterial is in the second state. When producing an altered operational output, the device can continue operating, but the altered operational output can be non-indicative of the true operational state of the device. Devices containing a carbon nanomaterial that can be reconfigured from a normal operational output to an altered operational output are also described herein.

31 Claims, 6 Drawing Sheets

RECONFIGURABLE DEVICES CONTAINING CARBON NANOMATERIALS AND METHODS FOR USING SAME

CROSS-REFERENCE TO RELATED APPLICATIONS

This application claims the benefit of priority under 35 U.S.C. §119 from U.S. Provisional Patent Application 61/378,073, filed Aug. 30, 2010, which is incorporated herein by reference in its entirety.

STATEMENT REGARDING FEDERALLY SPONSORED RESEARCH OR DEVELOPMENT

Not applicable.

FIELD OF THE INVENTION

The present invention generally relates to devices containing carbon nanomaterials, and, more particularly, to devices whose operational output can be reconfigured.

BACKGROUND

Reconfigurable devices whose functions and properties can be altered in response to an external input stimulus are of considerable interest in a variety of fields. Without limitation, devices in which reconfigurable characteristics can be desirable include, for example, coatings, sensors, electronic media and the like. Most often, reconfigurable devices can be made to be reversibly reconfigurable, such that the normal operational state of the device is restored once the input stimulus is removed and the properties of the altered operational state are no longer needed. However, irreversible reconfiguration can also be desirable for certain types of devices. Although a variety of reconfigurable devices have been developed, there is still an ongoing need to further develop this technology.

Anti-tampering devices, in particular, are a class of devices that can benefit from having reconfigurable characteristics. Tampering of industrial devices, particularly in the electronics industry, represents an ongoing challenge for manufacturers. As used herein, the terms "tamper" or "tampering" will refer to any unauthorized use, access or investigation of a device, whether malicious or not. At a minimum, tampering can sometimes result in the improper operation of or damage to a device. In other cases, a device can be modified in a manner that makes the device operate in a way that is inconsistent with that which its manufacturer intended. In this regard, a manufacturer may wish to have evidence that an unauthorized modification has occurred (e.g., for warranty validation purposes). Imparting tamper resistance to a device can also lessen the likelihood that unauthorized personnel can perform maintenance on the device.

An even more significant concern for manufacturers is the unwanted evaluation of a device and its components for reverse engineering or other malicious purposes. In such cases, a manufacturer may wish to temporarily or permanently change the operational performance of a device while it is being improperly examined or manipulated in order to prevent loss of valuable corporate knowledge.

Although a variety of systems to prevent tampering have been implemented in industrial devices, there is still an ongoing need to develop new anti-tampering paradigms. In this regard, it can generally be desirable for an anti-tampering system to resist tampering, detect when tampering has occurred or is occurring, respond to tampering, and to provide evidence of past tampering. However, it is not necessary that an anti-tampering system alert the tamperer that an anti-tampering system is in place.

In view of the foregoing, methods and systems for reconfiguring a device in response to an input stimulus would be of substantial benefit in the art. The present invention satisfies the foregoing need and provides related advantages as well.

SUMMARY

In various embodiments, methods described herein include providing a device containing a carbon nanomaterial in a first state, where the carbon nanomaterial in the first state is used to produce a normal operational output of the device; and applying an input stimulus to the carbon nanomaterial so as to change the first state into a second state, where the device continues operating when the carbon nanomaterial is in the second state but produces an altered operational output that is not indicative of a true operational state of the device.

In other various embodiments, methods described herein include providing a device containing a carbon nanomaterial in a first state, where the carbon nanomaterial in the first state is used to produce a normal operational output of the device; applying an input stimulus to the carbon nanomaterial in response to an unauthorized use or investigation of the device so as to change the carbon nanomaterial from the first state into a second state, where the device produces an altered operational output while the input stimulus is being applied, and the altered operational output results in improper functioning of the device; and restoring the normal operational output of the device when the unauthorized use or investigation of the device ceases.

In various embodiments, devices described herein include a carbon nanomaterial that is switchable between a first state and a second state, where the first state produces a normal operational output of the device and the second state produces an altered operational output that is not indicative of a true operational state of the device; and an input element for applying an input stimulus to the carbon nanomaterial that is operable to switch the carbon nanomaterial from the first state into the second state.

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

The present disclosure is directed, in part, to methods for reconfiguring a device containing a carbon nanomaterial. The present disclosure is also directed, in part, to reconfigurable devices containing a carbon nanomaterial.

Carbon nanotubes and other carbon nanomaterials (e.g., graphene, oxidized graphene, graphene-like films and graphene bilayers) can be particularly well suited for use in the presently described embodiments due to their favorable electrical, thermal and optical properties. Particularly, the electrical, thermal and optical properties of carbon nanomaterials can be reversibly or irreversibly changed in response to a stimulus such that the change can be detected or quantified in some manner. For example, in some embodiments, carbon nanomaterials can be reconfigured from a low resistance state to a high resistance state, or vice versa. Likewise, in some embodiments, carbon nanomaterials can be reconfigured from a low thermal conductivity state into a high thermal conductivity state, or vice versa. In still other embodiments, carbon nanomaterials can be reconfigured from having a low index of refraction into having a high index of refraction, or vice versa. In some embodiments, metallic and semiconducting carbon nanotubes can be interconverted in the presence of a magnetic field to change the observed conductivity. As used herein, the terms "low" and "high" are not meant to imply any particular magnitude for a given property, and instead are meant to indicate that a first state and a second state are detectably different from one another.

According to the present embodiments, these reconfigurable properties or others of carbon nanomaterials can be used to favorably change a device from a normal operational state into an altered operational state. In some embodiments, the change from a normal operational state into an altered operational state can occur in response to a tampering event. For example, the altered operational state can be a state that results in an improper functioning of the device (e.g., such that the device performs less than all of its functions, completely shuts down, produces a faulty output, inactivates certain components such that their function cannot be discerned, and/or the like). In some embodiments, the device can still continue operating and give the appearance of being in its true operational state while producing an altered operational output. When producing an altered operational output, the output of the device can be faulty in some characteristic, although this characteristic may not be readily evident from that obtained during the normal operational output.

In alternative embodiments, the change from a normal operational state to an altered operational state can occur during the course of a routine operation of the device, where this change is desired and beneficial. For example, in some embodiments, the altered operational state can increase or decrease the sensitivity of the device, activate certain components in a device that only need to be operational in the presence of particular stimuli, and/or the like.

A number of techniques can be used to reconfigure a carbon nanomaterial from a first state into a second state, including those noted above. Illustrative but non-limiting techniques for reconfiguring a carbon nanomaterial can include, for example, exposing the carbon nanomaterial to an electric current, an electric field, a magnetic field, a mechanical stress, or a thermal source. In addition, molecules associated with the carbon nanomaterial can alter the properties of the carbon nanomaterial, depending on the properties of the molecules themselves. Additional disclosure regarding techniques for reconfiguring carbon nanomaterials within a device are set forth in greater detail hereinbelow.

It is to be recognized that carbon nanomaterials can be used not only to reconfigure the operational output of devices, but they can also be used more broadly to influence the properties of a number of different types of articles. In this regard, carbon nanomaterials can be used to alter the performance and properties of coatings, sensors, and the like, where reversible or irreversible property alteration is desired before or after the article has been formed. That is, the properties of an article containing a carbon nanomaterial can be altered after the article has been formed, or the carbon nanomaterial can be pre-transformed in order to convey a desired property to the formed article. As described above, property alteration in coatings, sensors and other types of articles can be accomplished through converting carbon nanomaterials therein between various states in response to a stimulus, where each state has at least one detectably different physical property. Illustrative but non-limiting articles in which reconfigurable carbon nanomaterials can be used include, for example, reconfigurable logic devices, field programmable gate arrays (FPGAs), optical components and electronic sensors. In some embodiments, the carbon nanomaterials can form a plurality of conduction pathways within the article such that the operational performance of the article can be altered in response to an input stimulus. In some embodiments, all of the carbon nanomaterials in an article can be changed in response to an input stimulus. In other embodiments, only a portion of the carbon nanomaterials can be changed in response to an input stimulus. Further, not all of the carbon nanomaterials are necessarily changed in the same way or in the same magnitude by the input stimulus. Still further, different types of input stimuli can be used to change different regions of the carbon nanomaterials within an article. Illustrative but non-limiting means for altering the properties of carbon nanomaterials are set forth in greater detail hereinbelow.

In some embodiments, carbon nanomaterials can form various electrical circuits (interconnects) within an article, where the electrical circuits can become rerouted in response to an input stimulus. For example, in response to a tampering event, various portions of carbon nanomaterials within an article can be changed from a first state into a second state, which alters the operational output of the article by changing the electrical, thermal or optical conduction pathways therein.

More generally, devices and articles containing carbon nanomaterials can be reconfigured in response to an external stimulus. In some embodiments, the external stimulus can directly induce a change in state of the carbon nanomaterials. In other embodiments, the external stimulus can trigger an internal stimulus within the device or article that induces a change in state of the carbon nanomaterials.

In some embodiments, devices containing a carbon nanomaterial that is switchable between a first state and a second state and an input element for applying an input stimulus to the carbon nanomaterial are described herein, where the input stimulus can be operable to change the carbon nanomaterial from the first state into the second state. The carbon nanomaterial in the first state can be used to produce a normal operational output of the device. The carbon nanomaterial in the second state can be used to produce an altered operational output of the device. For example, the second state can have different physical properties than the first state, such that the change in properties between the first state and the second state can produce the altered operational output. In some embodiments, the altered operational output of the device can be non-indicative of a true operational state of the device. That is, the device can appear to be operating normally in the altered operational state, but at least one component therein can be operating in a non-normal state. For example, in the altered operational state, circuits or processing elements that are not normally active can be activated and normally active circuits and processing elements can become at least temporarily deactivated.

In some embodiments, the input element can be operable to apply the input stimulus to the carbon nanomaterial in response to an unauthorized use or investigation of the device. In some embodiments, the input stimulus can result directly from the unauthorized use or investigation of the device (e.g., exposure to air, electric fields, ion beams and the like). That is, the input stimulus can be an external stimulus in some embodiments. In other embodiments, the input stimulus can result from existing hardwired circuitry within the device or a like existing mechanism within the device. That is, the input stimulus can be an internal stimulus that is triggered by an external event in such embodiments.

Unauthorized uses and investigations of a device can include, but are not limited to, opening the outer cover of a device; probing the working components and/or circuitry of a device; attempting to modify the working components and/or circuitry of a device; and operating the device under electrical, thermal or other environmental conditions under which the device may operate unsatisfactorily, produce a faulty output, or even be dangerous. In some embodiments, the unauthorized use of a device can be unintentional on the part of a user. In other embodiments, the user of a device can have malicious intent that is undesired by a manufacturer of the device. In either case, the unauthorized use of the device can represent a tampering event.

In some embodiments, the altered operational output of the device can result in an improper functioning of the device. The improper functioning of the device can be visible to a user in some embodiments. For example, when the carbon nanomaterial is in the second state, the device can become partially or fully inoperative and/or the device can enter a partially or fully locked state until the carbon nanomaterial is returned to the first state such that normal operation of the device resumes. In other embodiments, the improper functioning of the device may not be evident to a user. For example, when the carbon nanomaterial is in a second state, the device can produce an output that is not the true output of the device, or various electrical connections (e.g., circuits) within the device can be activated, inactivated, and/or rerouted such that the normal operating mode of the device cannot be discerned. When the altered operational output of a device is not evident to a user, attempts to reverse engineer or otherwise maliciously obtain information from a device can be thwarted.

In some embodiments, the carbon nanomaterials can be irreversibly changed by exposure to the input stimulus. For example, in some embodiments, the manufacturer of a device may wish to irreparably change the operational components of a device such that its normal operational mode cannot be easily discerned. In some embodiments, the device can be intended for "one-time" use until the carbon nanomaterials therein are changed upon exposure to an input stimulus. A non-limiting example of a device in which it can be desirable to have carbon nanomaterials that are irreversibly changed upon exposure to an input stimulus is a sensor for shipping applications. Applications for such sensors can include monitoring for conditions such as, for example, temperature, humidity, tilting, shock, and/or the like. In such applications, the carbon nanomaterials in the sensors can be irreversibly altered to change the state of the sensor such that a quality control record of a shipment can be logged.

In some embodiments, the carbon nanomaterial can be changed into the second state only while the input stimulus is being applied. That is, in such embodiments, the carbon nanomaterial can be reversibly changed into the second state, and the first state can be re-attained after the input stimulus has been discontinued. In other embodiments, the carbon nanomaterial can remain in the second state after the input stimulus is removed, but the first state can be reversibly reformed after applying a second input stimulus to the carbon nanomaterial. In either case, the reversible change to the carbon nanomaterial can alter the operational performance of the device, particularly while the device is being exposed to conditions that result in the input stimulus being applied. For durable goods that are intended for long-term use, it is generally preferred to reversibly change the carbon nanomaterial into the second state, since the operational performance of the device would otherwise be irreparably changed if the second state of the carbon nanomaterial is formed irreversibly. Illustrative devices in which it can be desirable to reversibly change the state of the carbon nanomaterial therein can include, for example, computers, consumer electronic devices, wireless devices, communication devices, scientific instruments and the like.

In still other embodiments, the carbon nanomaterial can be reversibly changed from a first state, into a second state, and back into a third state that is not the same as the first state. That is, in such embodiments, the carbon nanomaterial can be reversed from a second state that can be used to alter the properties of a device (e.g., in response to a tampering event), but the carbon nanomaterial does not completely reform the first state. In some embodiments, the properties of the third state can be intermediate in the magnitude between the first state and the second state. In other embodiments, the properties of the third state can be greater in magnitude than the first state. When the carbon nanomaterials are in the third state, the device can operate normally in some embodiments or operate with a diminished or greater capacity in other embodiments. In such embodiments, the identification that the carbon nanomaterial is operating in a third state can be used to identify that a tampering event has occurred. Although the foregoing discussion has been directed to carbon nanomaterials having three states, it should be recognized that some embodiments of the present devices can contain carbon nanomaterials having more than three states.

As previously noted, the electrical, thermal and optical properties of carbon nanomaterials can make them particularly well suited for reversibly or irreversibly changing the operational performance of a device. In some embodiments, carbon nanomaterials suitable for use in the present devices can be carbon nanotubes. In other embodiments, carbon nanomaterials suitable for use in the present devices can be graphene. It should be recognized that graphene has many properties in common with carbon nanotubes, and it is expected that any embodiment described herein using carbon nanotubes can be implemented similarly using graphene or another carbon nanomaterial having like properties. In particular, both carbon nanotubes and graphene can have high electrical and thermal conductivity values that can be particularly advantageous in the embodiments described herein.

As used herein, the term "graphene" will refer to a single- or few-layer (e.g., less than 10 layer) two-dimensional carbon sheet having predominantly $sp^2$ hybridized carbons. Pristine graphene having no defect sites in its basal plane has a very high electrical conductivity. In pristine graphene, all of the carbon atoms are bonded to other carbon atoms except for carbon atoms on the edge of the carbon sheet. When the graphene contains defect sites in its basal plane, there can be a small fraction of non-$sp^2$ hybridized carbons and/or carbon atoms in the basal plane that are not bonded to other carbon atoms. Although graphene containing defect sites can still be electrically conductive, the degree of conductivity can be lower than that of pristine graphene. In the embodiments described herein, use of the term graphene should not be construed to be limited to any particular form of graphene unless otherwise noted, and depending on the properties desired for the graphene, any suitable graphene can be used.

In some embodiments, the graphene can be an oxidized graphene. As used here, the term "oxidized graphene" will refer to graphite that has been reacted with an oxidant and exfoliated to produce graphene sheets that contain a high degree of oxygenated functionalities. Illustrative techniques for making oxidized graphene can include, for example, the methods of Hummers and Staudenmaier, which can use $KClO_3$ or $KMnO_4$ to introduce the oxygenated functionalities. Oxygenated functionalities on the oxidized graphene can include carboxylic acids, alcohols, epoxides and ketones. In general, oxidized graphene is not electrically conductive but it is thermally conductive. In some embodiments, the graphene can be a reduced graphene. As used herein, the term "reduced graphene" will refer to a graphene that has been produced from an oxidized graphene by reduction to remove at least a portion of its oxygenated functionalities. Illustrative reducing agents suitable for reducing oxidized graphene can include, for example, hydrazine or hydrogen. Thermal reduction of the oxygenated functionalities can be used as well. In general, the reduction of oxidized graphene to produce reduced graphene restores at least some of the electrical conductivity thereto.

In their most basic form, carbon nanotubes consist of a sheet of graphene that has been rolled into the form of a cylinder, where the ends of the cylinder can be either open or closed. The types of carbon nanotubes used in the present embodiments can generally vary without limitation. In various embodiments, the carbon nanotubes used in the present devices can be single-wall carbon nanotubes, double-wall carbon nanotubes, multi-wall carbon nanotubes, or any combination thereof. In some embodiments, the carbon nanotubes can be covalently or non-covalently functionalized using techniques that are familiar to one having ordinary skill in the art.

Carbon nanotubes can be metallic, semimetallic or semiconducting depending on their chirality. In addition to chirality, a carbon nanotube's diameter also can influence its electrical conductivity and the related property of thermal conductivity. For example, single-wall carbon nanotubes can be metallic, semimetallic or semiconducting depending on their chirality. In contrast, multi-wall carbon nanotubes, which have larger diameters, are more typically metallic conductors. In some embodiments, carbon nanotubes can be interconverted between metallic and semiconducting forms by applying a magnetic field thereto.

Carbon nanotubes used in the present embodiments can generally be of any length. In some embodiments, the carbon nanotubes can have a length ranging between about 0.5 µm and about 500 µm. In some embodiments, the carbon nanotubes can have a length of less than about 1 µm. In some embodiments, the carbon nanotubes can have a length ranging between about 1 µm and about 100 µm or between about 10 µm and about 100 µm. In some embodiments, the carbon nanotubes can have a length ranging between about 50 µm and about 100 µm. Longer carbon nanotubes (e.g., about 50 µm or greater in length) can generally have greater electrical and thermal conductivity values compared to shorter carbon nanotubes due to a greater likelihood of nanotube-to-nanotube contact.

In some embodiments, the carbon nanomaterial can use individual carbon nanotubes that are substantially dispersed from one another. In other embodiments, bundles of carbon nanotubes can be used. In some embodiments, the carbon nanomaterial can be in the form of a carbon nanotube fabric, which can optionally be patterned, if desired. Illustrative techniques for placing carbon nanotube fabrics on a substrate are set forth in U.S. Pat. No. 7,334,395, which is incorporated herein by reference in its entirety. In various embodiments, a non-woven carbon nanotube fabric can be grown over a substrate through use of a catalyst in a suitable carbon nanotube growth environment. In other various embodiments, a matted carbon nanotube layer (e.g., a buckypaper) can be formed separately and applied to a substrate. Optionally, patterning can be performed after the matted carbon nanotube layer has been applied to a substrate. In still other various embodiments, a carbon nanotube fabric can be applied to a substrate by spin coating or spray coating a carbon nanotube solution or suspension, for example. In some embodiments, the carbon nanotube fabric can be in the form of a monolayer of carbon nanotubes. In other embodiments, the carbon nanotube fabric can be in the form of multiple carbon nanotube layers.

In some embodiments, the present devices can also include a carbon nanomaterial whose state remains unchanged during the operation of the device. In some embodiments, the carbon nanomaterial whose state remains unchanged can be in electrical or thermal contact with the carbon nanomaterial whose state is being changed during operation of the device. For example, the carbon nanomaterial whose state is being changed and the carbon nanomaterial whose state is unchanged can be part of a continuous circuit in a device. In this regard, the carbon nanomaterial whose state is being changed can serve as a switch to open or close the continuous circuit or to trigger a new circuit while the input stimulus is being applied. In such embodiments, the difference between a circuit that is open or closed may not be visible to an observer, and efforts to probe the circuit can change the operational performance of the circuit. In some embodiments, the carbon nanomaterials can both initially be in the same state but be in different states once the input stimulus is applied. In other embodiments, the carbon nanomaterials can initially be in different states but be in the same state once the input stimulus is applied. In still other embodiments, the carbon nanomaterials can be in different states both before and after the input stimulus is applied, where one of the carbon nanomaterials is changed from a first state into a second state and one of the carbon nanomaterials remains in the same state during application of the input stimulus. In some embodiments, the carbon nanomaterial whose state remains constant can be chosen such that it is not influenced by the input stimulus or is significantly less influenced by the input stimulus than the carbon nanomaterial whose state is changed. In other embodiments, the input stimulus can be configured such that it does not influence the carbon nanomaterial whose state is not intended to be changed.

Several illustrative devices in which a carbon nanomaterial can be changed from a first state into a second state to alter the operational output of the devices are described hereinafter. It is to be recognized that the described embodiments should be considered illustrative in nature only, and any device configuration capable of changing a carbon nanomaterial from a first state into a second state in order to alter the operational output of the device can be used within the spirit and scope of the present disclosure. Further, it is to be recognized that the devices described hereinafter can be used as part of larger articles and devices to modify the devices from a normal operational state into an altered operational state.

Alterations Based Upon Association/Dissociation of Molecules: In some embodiments, the present devices can further include molecules that are associated with the carbon nanomaterial. In some embodiments, association or dissociation of the molecules to and from the carbon nanomaterial can result in alteration of the carbon nanomaterial between the first state and the second state. Unless specifically indicated otherwise, the term "associated" will refer to both a non-covalent association (that is, ionic bonding, hydrogen bonding, physisorption, and the like) and a covalent association (that is, covalent bonding) between the carbon nanomaterial and the molecules. For example, application of an input stimulus to a carbon nanomaterial further containing associated molecules can result in dissociation of non-covalently bound molecules from the carbon nanomaterial in some embodiments, or breaking of covalent bonds to the carbon nanomaterial in other embodiments. Depending on the properties of the molecules, the association/dissociation can either increase or decrease the electrical conductivity and thermal conductivity of the carbon nanomaterial. That is, the molecules can alter the resistivity of the carbon nanomaterial. For example, when the molecules have electron donating properties, the resistivity of the carbon nanomaterial can be increased. Likewise, when the molecules are electron withdrawing, the resistivity of the carbon nanomaterial can be decreased.

Figure 1A:
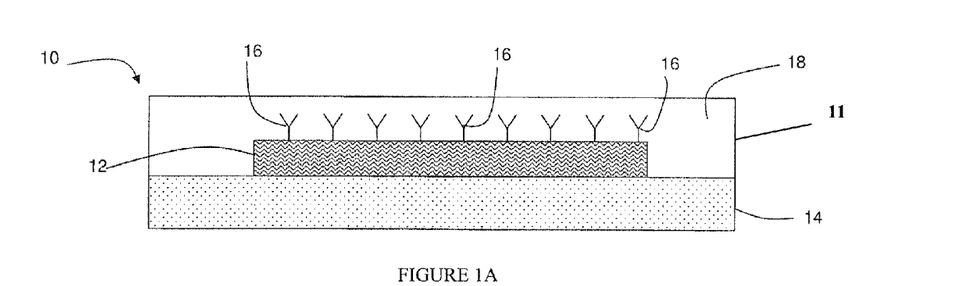
FIG. 1A shows a schematic of an illustrative device containing a carbon nanomaterial and molecules associated therewith.

FIG. 1A shows a schematic of an illustrative device containing a carbon nanomaterial and molecules associated therewith. As shown in FIG. 1A, device 10 has carbon nanomaterial fabric 12 (e.g., a carbon nanotube fabric) having a first electrical and thermal conductivity state deposited on substrate 14. Carbon nanomaterial fabric 12 can have a plurality of molecules 16 associated therewith. Depending on the electronic character of molecules 16, carbon nanomaterial fabric 12 can initially be in either a high conductivity state or a low conductivity state. Device 10 can be enveloped by chamber 11 so as to define cavity 18. Cavity 18 can be filled with a liquid, an inert gas, or be maintained in a full or partial vacuum.

Figure 1B:
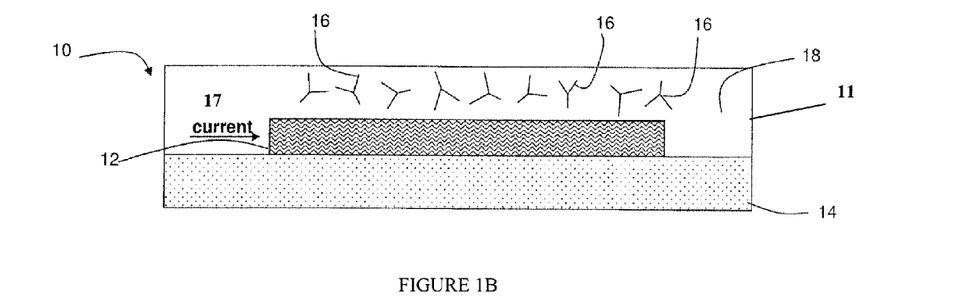
FIG. 1B shows a schematic of an illustrative device containing a carbon nanomaterial and molecules associated therewith after application of an input stimulus to the carbon nanomaterial.

In some embodiments, at least a portion of the molecules are not associated with the carbon nanomaterial while the input stimulus is being applied, such that the electrical or thermal conductivity of the carbon nanomaterial is altered. FIG. 1B shows a schematic of an illustrative device containing a carbon nanomaterial and molecules associated therewith after application of an input stimulus to the carbon nanomaterial. Upon application of current 17 to carbon nanomaterial fabric 12, molecules 16 can dissociate from carbon nanomaterial fabric 12 and enter cavity 18. The dissociation of molecules 16 from carbon nanomaterial fabric 12 can result in a change of the fabric from a high conductivity state to a low conductivity state, or vice versa, depending on the electronic character of molecules 16. In an alternative embodiment, heat can be applied to carbon nanomaterial fabric 12 to cause a similar dissociation of molecules 16 from carbon nanomaterial fabric 12. Since molecules 16 are constrained by chamber 11, they are prevented from leaving cavity 18.

Upon discontinuation of current 17 (or heat) to carbon nanomaterial fabric 12, molecules 16 can then re-associate with the fabric so as to regain the original conductivity state in some embodiments. At this point, device 10 again resembles that shown in FIG. 1A. In the embodiments described in FIGS. 1A and 1B, the association/dissociation of molecules 16 from carbon nanomaterial fabric 12 is reversible such that the device can perform multiple switching operations.

In an alternative embodiment of the device shown in FIGS. 1A and 1B, chamber 11 can be omitted such that molecules 16 are no longer contained within a closed system. In this alternative embodiment, upon application of current 17 (or heat) to carbon nanomaterial fabric 12, molecules 16 can again dissociate from the fabric. However, since molecules 16 are no longer contained within a closed system, they can dissipate away from carbon nanomaterial fabric 12 such that they can no longer completely re-associate therewith. That is, in this alternative embodiment, the device can be irreversibly altered into a second operational state.

Figure 1C:
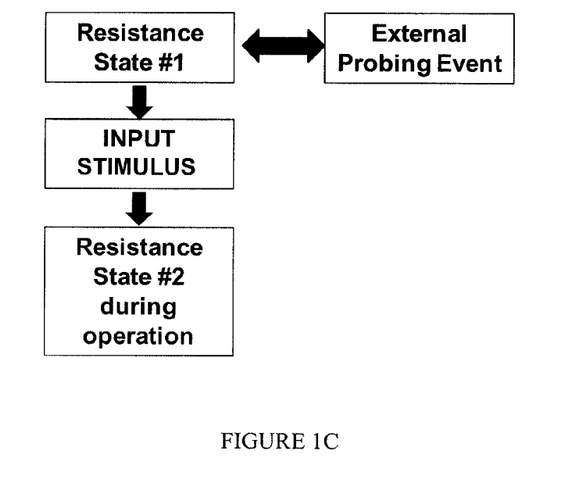
FIGS. 1C and 1D show illustrative diagrams indicating how an input stimulus can be used to affect a state change in a carbon nanomaterial.
Figure 1D:
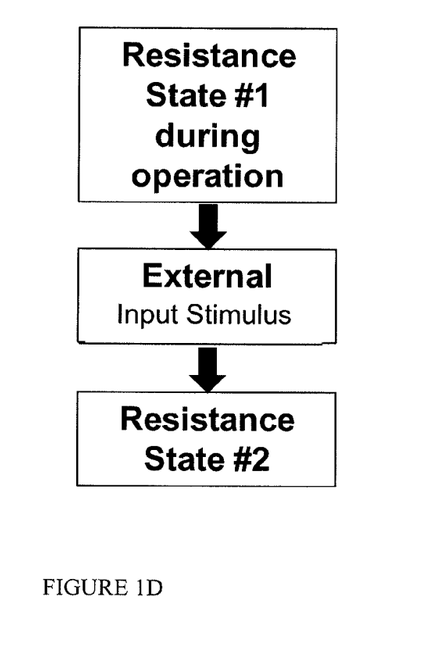

FIGS. 1C and 1D show illustrative diagrams indicating how an input stimulus can be used to affect a state change in a carbon nanomaterial. In some embodiments, the input stimulus can be internal, which can be triggered in response to an external probing event. In some embodiments, the input stimulus can be external such that it directly results in the state change of the carbon nanomaterial.

In yet another embodiment, a portion of molecules 16 can re-associate with carbon nanomaterial fabric 12 to form a third state that is intermediate in properties between the second state and the first state. In some embodiments, the third state can be used as an indicator to verify that a tampering event has occurred.

In yet another embodiment, molecules 16 can initially be covalently bound to carbon nanomaterial fabric 12 in the first state. Upon application of current 17 (or heat) to carbon nanomaterial fabric 12, the covalent bonds to molecules 16 can be broken so as to liberate the free molecules within cavity 18. After current 17 (or heat) is discontinued, molecules 16 can re-associate with carbon nanomaterial fabric 12. In some embodiments, the re-association of molecules 16 to carbon nanomaterial fabric 12 can involve a physisorption, rather than covalent bond formation. This can cause a different electronic interaction of molecules 16 with carbon nanomaterial fabric 12 than was present in the first state. Hence, carbon nanomaterial fabric 12 can attain a third state in such embodiments.

Alterations Based Upon Use of a Phase Change Material: In some embodiments, the present devices can further include a phase change material that is associated with the carbon nanomaterial. In some embodiments, the phase change material can be in electrical, mechanical or thermal communication with the carbon nanomaterial. As used herein, a "phase change material" is a substance that changes in form upon application of electric current or heat thereto, and where the forms have different electrical and/or thermal conductivity values from one another. Illustrative changes in form can include, for example, changes in form from a higher ordered state to a lower ordered state (e.g., a crystalline state to an amorphous state or a solid state to a liquid state). These types of changes can affect the thermal and electrical conductivity of the phase change material, which can, in turn, be used to alter the operational mode of the device in response to an appropriate input stimulus.

In some embodiments, the change in the phase can be irreversible. That is, in such embodiments, the phase change material does not revert to its original state once the electrical current or heat is discontinued. In other embodiments, the change in the phase change material can be reversible. That is, in such embodiments, the phase change material can revert to its original state once the electrical current or heat is removed. In some embodiments, an electrical current of a different magnitude or a different temperature can be used to cause the phase change material to revert to its original state. Thus, the phase change material can be used to produce a temporary or permanent change in operational performance of a device in which it is used.

Illustrative phase change materials that can be suitable for use in the present embodiments include, for example, chalcogenides (e.g., GeSbTe, InSe, SbSe, AgInSbTe and the like). In some embodiments, suitable phase change materials can be phase change polymers.

Figure 2A:
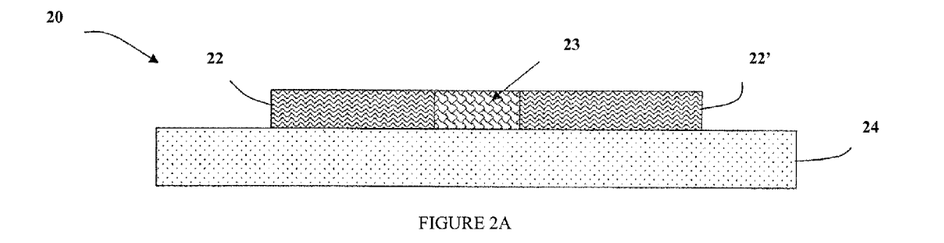
FIG. 2A shows a schematic of an illustrative device containing a phase change material in association with a carbon nanomaterial.

FIG. 2A shows a schematic of an illustrative device containing a phase change material in association with a carbon nanomaterial. As shown in FIG. 2A, device 20 has a carbon nanomaterial fabric 22 and 22' (e.g., a carbon nanotube fabric) that is interconnected with phase change material 23 on substrate 24. By applying an electric current to phase change material 23 or by heating phase change material 23, a change from a high conductivity (electrical or thermal) state to a low conductivity (electrical or thermal) state, or vice versa, can be accomplished. In general, the low order state of the phase change material can be the low conductivity state and the high order state can be the high conductivity state. That is, device 20 can be configured such that phase change material 23 is initially in an low order state to produce a high resistance or such that phase change material 23 is initially in a high order state to produce a low resistance. In some embodiments, electric current or heat can be applied to phase change material 23 through carbon nanomaterial fabric 22 and 22'. In other embodiments, electrical current or heat can be applied to phase change material 23 through a separate circuit (not shown) that bypasses carbon nanomaterial fabric 22 and 22'. Although FIG. 2A has presented two different portions of carbon nanomaterial fabric (22 and 22') contacting phase change material 23, it is to be recognized that in alternative embodiments, a single portion of phase change material that is disposed on, within or under the carbon nanomaterial fabric can be used to produce a similar effect.

Figure 2B:
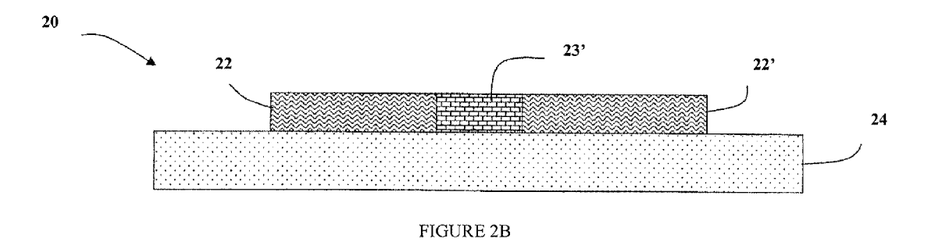
FIG. 2B shows a schematic of an illustrative device containing a phase change material in association with a carbon nanomaterial in which the phase change material has been changed into a conductivity state opposite that of FIG. 2A.

Depending upon whether the phase change material is initially in a high resistance state or a low resistance state, electrical current or thermal energy applied thereto can alter the phase change material into the opposite conductivity state. That is, a high resistance state can be changed into a low resistance state, or vice versa. FIG. 2B shows a schematic of an illustrative device containing a phase change material in association with a carbon nanomaterial in which phase change material 23 has been changed into a conductivity state opposite that of FIG. 2A. In FIG. 2B, phase change material 23' is in a different state than that of FIG. 2A. In the embodiment shown in FIGS. 2A and 2B, if phase change material 23' is switched into a high resistivity state, the carbon nanomaterial fabric 22 and/or 22' of device 20 can be in a low conductivity state, since phase change material 23' can effectively act as a switch to control conduction between carbon nanomaterial fabric 22 and 22'. Likewise, if phase change material 23' is switched into a low resistivity state, carbon nanomaterial fabric 22 and/or 22' of device 20 can be in a high conductivity state. It should be noted that in the embodiments described in FIGS. 2A and 2B, the input stimulus to carbon nanomaterial 22/22' is indirect, since phase change material 23/23' is signaled first, and the property change of the carbon nanomaterial results from the increase or decrease in conductivity of the phase change material.

Upon discontinuation of current or heat to carbon nanomaterial fabric 20/22', phase change material 23' can either revert to its original conductivity state or remain in its altered state. In some embodiments, a current of different magnitude or heating at a different temperature can be used to revert phase change material 23' back to its original state, thereby reverting carbon nanomaterial fabric 22/22' back to its original state. That is, in such embodiments, a current or temperature of an appropriate magnitude can be used to revert the phase change material back to its original state, at which point device 20 again resembles that shown in FIG. 2A. The ability to produce a high or low conductivity state in the phase change material and carbon nanomaterial fabric can be used to control the operation of a device in which they are used. For example, in response to an input stimulus, certain conductivity pathways within the device can be turned on or off such that the device no longer operates the same way as it did prior to application of the input stimulus. The alteration of the device can mask the device's true operational output. When the input stimulus is removed, the device can either return to its pre-alteration state or remain in its altered operational state.

In some embodiments, phase change material 23 can be in mechanical communication with carbon nanomaterial fabric 22 and/or 22'. In such embodiments, the change in phase from high order state to a low order state, or vice versa, (i.e., the conversion of phase change material 23 into phase change material 23'), can be used to impart a mechanical stress to carbon nanomaterial fabric 22 and/or 22'. The applied mechanical stress can thereby impart a property change to the fabric by causing an elongation or compression thereof to change its electrical or thermal properties. Likewise, once phase change material 23' has been reverted to its original state, the mechanical stress on carbon nanomaterial fabric 22 and/or 22' can be removed, thereby returning the fabric to its original state.

In still other embodiments, the phase change material can undergo a change in phase from a solid to a liquid or vice versa. Not only can the solid-to-liquid phase change (or vice versa) result in a different mechanical stress to the carbon nanomaterial fabric, but it can also produce non-covalent functionalization effects similar to those described above. Specifically, when the phase change material is in the liquid state, the liquid molecules can more readily interact with the carbon nanomaterial fabric to change the properties of the carbon nanomaterial. Thus, the change from a liquid to a solid state can mirror the effects of association and dissociation of molecules from the carbon nanomaterial fabric.

Alterations Based Upon Electrical Switching of a Carbon Nanomaterial: In some embodiments, the carbon nanomaterial can be converted from a high resistance state to a low resistance state, or vice versa, by applying an electrical pulse of an appropriate magnitude to the carbon nanomaterial. That is, the carbon nanomaterial can be converted from a first state having a first resistance into a second state having a second resistance upon application of an electrical pulse. The conversion between the high resistance state and the low resistance state can be non-volatile. That is, to maintain the high resistance state or the low resistance state, is not necessary that the electrical current be maintained in the carbon nanomaterial. Another characteristic of a non-volatile conversion can be that the first state can be restored to the carbon nanomaterial upon applying an electrical pulse of different magnitude to the carbon nanomaterial. For example, for a carbon nanomaterial initially in a high resistance state, an electrical pulse of a first magnitude can be used to alter the carbon nanomaterial into a low resistance state. Thereafter, the carbon nanomaterial can be returned to the high resistance state by applying an electrical pulse of even larger magnitude.

In some embodiments, the carbon nanomaterial can be used to form interconnects in the present devices. When used as interconnects, the carbon nanomaterial, in some embodiments, can have an electrical resistance ranging between about 0.1 Ohms and about 100 Ohms. When used as an interconnect there can be no visual difference between the low resistance state and the high resistance state, although the difference can be observed by using an electrical probe.

Figure 3A:
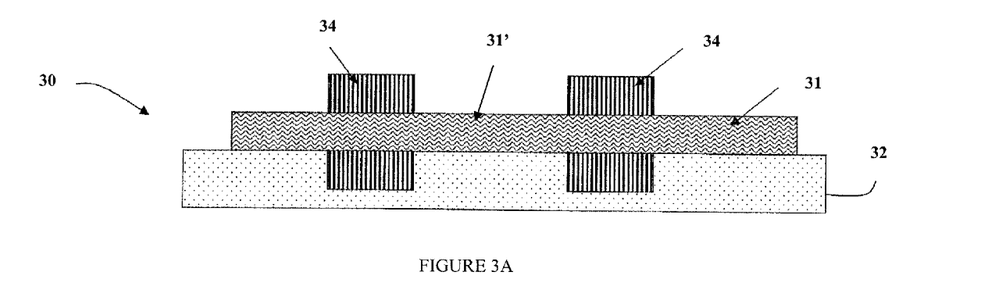
FIG. 3A shows a schematic of an illustrative device containing a carbon nanomaterial that can be reversibly switched between a first resistance state and a second resistance state.

FIG. 3A shows a schematic of an illustrative device containing a carbon nanomaterial that can be reversibly switched between a first resistance state and a second resistance state. As shown in FIG. 3A, device 30 has carbon nanomaterial fabric 31 deposited on substrate 32. Electrodes 34 contact carbon nanomaterial fabric 31, such that there is a region 31' of carbon nanomaterial fabric 31 between electrodes 34. As noted previously, region 31' of carbon nanomaterial fabric 31 can initially be in a high resistance state or a low resistance state, depending on how the device has been initially configured. That is, region 31' can initially be in the same resistance state or a different resistance state as the rest of carbon nanomaterial fabric 31. In the discussion that follows, it will be presumed that region 31' is initially in the same resistance state (e.g., a low resistance state) as the rest of carbon nanomaterial fabric 31.

Figure 3B:
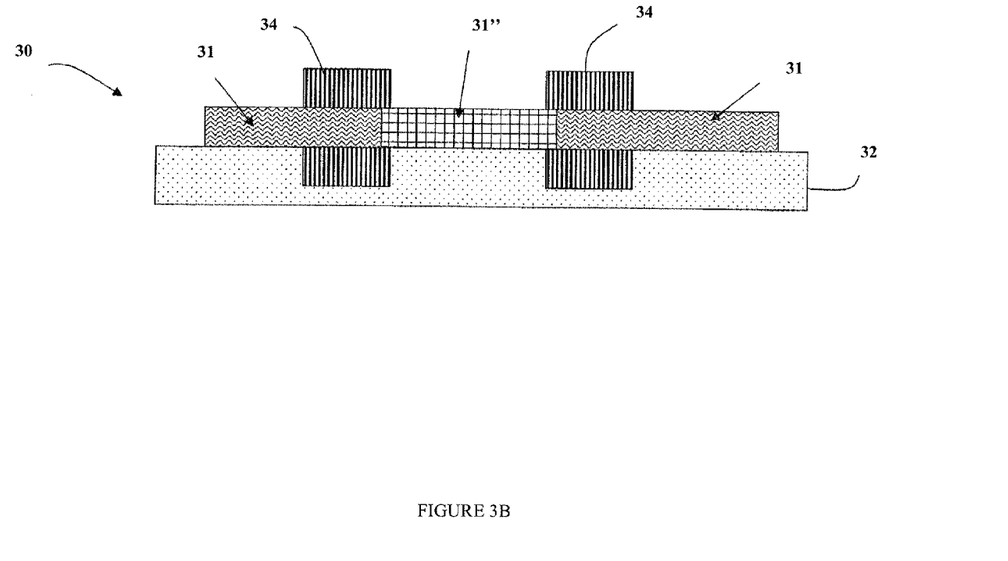
FIG. 3B shows a schematic of an illustrative device containing a carbon nanomaterial in which a portion of the carbon nanomaterial has been changed into a resistance state that is different than that of FIG. 3A.

When region 31' is initially in the same low resistance state as the rest of carbon nanomaterial fabric 31, carbon nanomaterial fabric 31 can define a continuous conduction pathway along its surface. If region 31' is converted into a high resistance state, however, carbon nanomaterial fabric 31 can no longer define a continuous conduction pathway on substrate 32. FIG. 3B shows a schematic of an illustrative device containing a carbon nanomaterial in which a portion of the carbon nanomaterial has been changed into a resistance state that is different than that of FIG. 3A. As shown in FIGS. 3A and 3B, application of an electrical pulse to region 31' using electrodes 34 results in a change in resistance state to form region 31". The resistance state of region 31" can be maintained after the electrical pulse has been discontinued. In some embodiments, the switching between resistance states can be irreversible. In such embodiments, device 30 can provide a record of prior tampering activity, for example. In other embodiments, the switching between resistance states can be reversible. In some embodiments, region 31" can be can be returned to the initial resistance state of region 31', shown in FIG. 3A, by applying an electrical pulse of different magnitude via electrodes 34. Accordingly, in some embodiments, device 30 can be used to reversibly switch conducting pathways on or off in response to a tampering event. That is, device 30 can form an interconnect between other electrical components in a larger device, where the formation of high- or low-resistance states in the interconnects can occur in response to an input stimulus resulting from a tampering event.

Figure 3C:
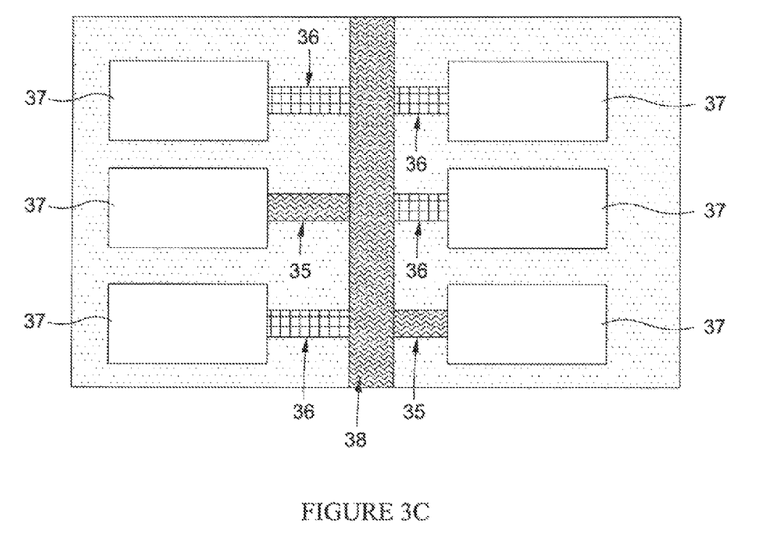
FIG. 3C shows a schematic of an illustrative reconfigurable device containing multiple carbon nanomaterial interconnects.

FIG. 3C shows a schematic of an illustrative reconfigurable device containing multiple carbon nanomaterial interconnects. As shown in FIG. 3C, application of an input stimulus along circuit 38 results in the formation of some low resistance interconnects 35 and some high resistance interconnects 36, all of which are connected to electrical elements 37 (e.g., a FPGA). As a result of the configuration of the interconnects upon application of the input stimulus, an altered output can be obtained from circuit 38. Further, one would not be able to determine which of electrical elements 37 were active simply based upon a visual inspection of the device. Although the interconnects are electrically active and subject to investigation, they can be located near electrical element 37 such that they are not readily accessible. Additionally, their true operating state can be further masked according to other embodiments described herein.

Alterations Based Upon Optical Property Modification: In some embodiments, the carbon nanomaterial can be altered into a different optical state. In some embodiments, the alteration into a different optical state can occur by applying an electric field to the carbon nanomaterial. In some embodiments, the electric field can alter the index of refraction of the carbon nanomaterial such that a wavelength of light being transmitted through the carbon nanomaterial can change. Carbon nanotubes, in particular, are a third-order non-linear optical material, meaning that application of an electrical field thereto can cause a polarization of the carbon nanotube electron cloud. This can give rise to third harmonic generation, frequency shifting, two photon absorption and an index of refraction that differs based upon the intensity of incident light.

Figure 4A:
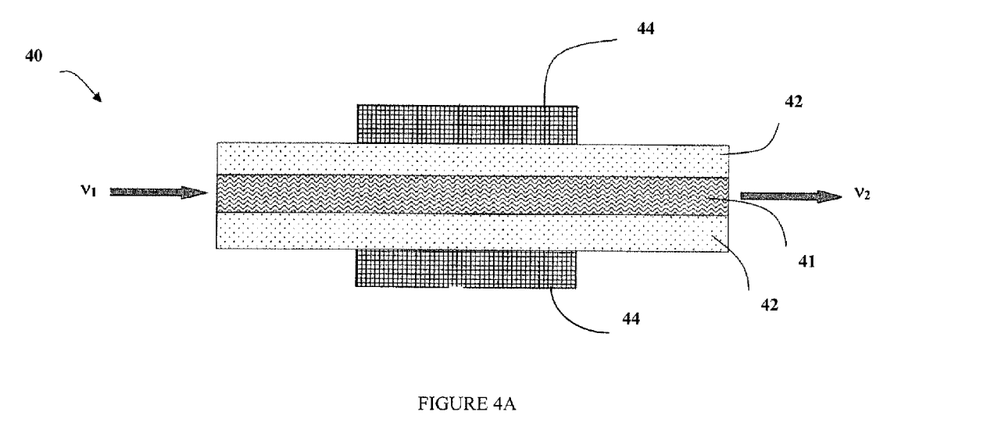
FIG. 4A shows a schematic of an illustrative device containing a carbon nanomaterial that can be reversibly switched between a first optical state and a second optical state, such that a wavelength of light transmitted therethrough changes.

FIG. 4A shows a schematic of an illustrative device containing a carbon nanomaterial that can be reversibly switched between a first optical state and a second optical state, such that a wavelength of light transmitted therethrough changes. As shown in FIG. 4A, device 40 has carbon nanomaterial fabric 41 deposited between substrates 42. Electrodes 44 are in electrical communication with carbon nanomaterial fabric 41. When no electric field is being applied to carbon nanomaterial fabric 41, incident light $v_1$ can be transmitted through carbon nanomaterial fabric 41 such that transmitted light $v_2$ has the same wavelength as incident light $v_1$. The light source for the incident light is not shown.

Figure 4B:
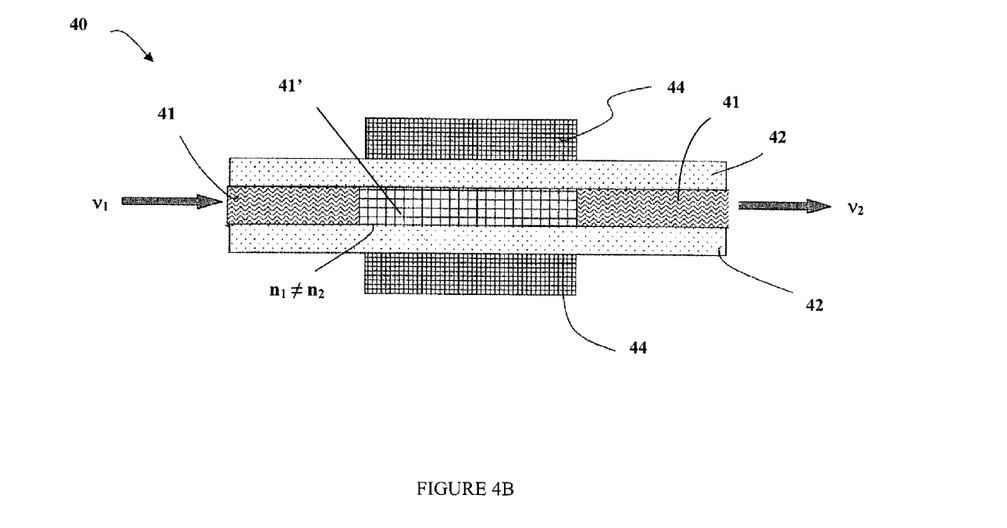
FIG. 4B shows a schematic of an illustrative device containing a carbon nanomaterial in which a portion of the carbon nanomaterial has been switched into an optical state that is different than that of FIG. 4A.

FIG. 4B shows a schematic of an illustrative device containing a carbon nanomaterial that has been switched into an optical state that is different than that of FIG. 4A. Upon application of an electric field to carbon nanomaterial fabric 41 via electrodes 44, region 41' of carbon nanomaterial fabric 41 can be optically transformed. In some embodiments, the optical transformation can be such that the refractive index ($n_2$) of region 41' differs from that of the bulk carbon nanomaterial fabric 41 ($n_1$) adjacent to region 41' (that is, $n_1 \neq n_2$). Accordingly, when the electric field is being applied to region 41', transmitted light $v_2$ has a wavelength that differs from that of incident light $v_1$. After application of the electric field is discontinued, the optical properties of carbon nanomaterial fabric 41 return to their original state, such that region 41' no longer has a different index of refraction. Accordingly, transmitted light $v_2$ again has a wavelength that is the same as that of incident light $v_1$, and device 40 again resembles that of FIG. 4A.

In some embodiments, the refractive index of region 41' can be modulated such that an optical filter can be fabricated where only a frequency $v_2$ is transmitted through carbon nanomaterial fabric 41 from a light source emitting frequencies $v_1$ and $v_2$. That is, the device shown in FIGS. 4A and 4B can be used as a monochromator in some embodiments. In some embodiments, a pump laser, instead of an electric field, can be used to modulate the index of refraction of region 41'.

In some embodiments, devices that can contain multiple groupings of carbon nanomaterials can be used, such that the states of the carbon nanomaterials can be controlled independently from one another. For example, in some embodiments, a first grouping of carbon nanomaterials can have its state modified by a first technique (e.g., association or dissociation of molecules), and a second grouping of carbon nanomaterials can have its state modified by a second technique (e.g., application of an electrical pulse). Other combinations of techniques can be envisioned by one having ordinary skill in the art and having the benefit of the present disclosure. Further, the types of carbon nanomaterial associated with each grouping can be of different types in some embodiments, such that the carbon nanomaterial groupings each respond differently to an input stimulus. Still further, in some groupings the carbon nanomaterials can be reversibly changed by an input stimulus, while in other groupings, the carbon nanomaterials can be irreversibly changed by an input stimulus. In this regard, the combination of carbon nanomaterial groupings can satisfy certain needs for anti-tampering technology, since the various carbon nanomaterial groupings can be used to both record evidence of tampering (i.e., by the irreversibly changed carbon nanomaterials) and preventing or inhibiting tampering (i.e., by the reversibly changed carbon nanomaterials).

In some embodiments, methods are disclosed herein for altering the operational output of devices that contain carbon nanomaterials. As previously set forth, illustrative carbon nanomaterials can include, for example, carbon nanotubes, graphene, and the like.

In some embodiments, the methods can include providing a device containing a carbon nanomaterial in a first state, and applying an input stimulus to the carbon nanomaterial so as to change the first state into a second state. In some embodiments, the methods can further include detecting an altered operational output of the device. The carbon nanomaterial in the first state can be used to produce a normal operational output of the device, and the device can continue operating when the carbon nanomaterial is in the second state but the device can produce an altered operational output. In some embodiments, the altered operational output is not indicative of the device's true operational state. In some embodiments, the devices can contain multiple groupings of carbon nanomaterials, such that each grouping can respond differently to the input stimulus, or such that each grouping can be stimulated separately with different input stimuli.

In some embodiments, the methods can include providing a device containing a carbon nanomaterial in a first state, applying an input stimulus to the carbon nanomaterial in response to an unauthorized use or investigation of the device so as to change the carbon nanomaterial from a first state into a second state, and restoring the normal operational output of the device when the unauthorized use or investigation of the device ceases. The carbon nanomaterial in the first state can be used to produce a normal operational output of the device. The device can produce an altered operational output while the input stimulus is being applied, and the altered operational output can result in improper functioning of the device.

In some embodiments, the present methods can further include removing the input stimulus from the carbon nanomaterial. In some embodiments, the carbon nanomaterial can revert to the first state when the input stimulus is removed. That is, in such embodiments, the carbon nanomaterial can be reversibly converted between states by the input stimulus. In other embodiments, the carbon nanomaterial can be irreversibly changed to the second state by the input stimulus. In some embodiments, the carbon nanomaterial can revert to a third state when the input stimulus is removed. In some embodiments, the third state can have properties that are intermediate between the first state and the second state.

In some embodiments, the input stimulus can be applied during an unauthorized use or investigation of the device such as, for example, a tampering event. In some embodiments, the altered operational output of the device can result in an improper functioning of the device. For example, in a tampering event, the device can be configured to become inoperable or produce a false output that can thwart the efforts of a person tampering with the device.

In various embodiments, illustrative input stimuli can include, for example, an electrical stimulus, a thermal stimulus, an optical stimulus, a mechanical stimulus, a magnetic stimulus, and any combination thereof. In some embodiments, an electrical stimulus of the carbon nanomaterial can include a fluorescence or Raman spectroscopy probing of the carbon nanomaterial. In the presence of one or more of these stimuli, various changes in the carbon nanomaterial or different groupings of carbon nanomaterials can occur that can alter the normal operational output of the present devices. That is, in the presence of one or more stimuli, the carbon nanomaterial(s) can be converted from a first state into a second state, and back again in some embodiments. Illustrative properties that can be changed in the first state and the second state can include, for example, thermal conductivity, electrical conductivity, index of refraction, and any combination thereof In various embodiments, as a result of the input stimuli, the normal operational output and the altered operational output of the devices can include a change in at least one property such as, for example, an electrical signal, a thermal signal, an optical signal, and any combination thereof.

It is understood that modifications which do not substantially affect the activity of the various embodiments of this invention are also included within the definition of the invention provided herein. Although the invention has been described with reference to the disclosed embodiments, one having ordinary skill in the art will readily appreciate that these embodiments are only illustrative of the invention. It should be understood that various modifications can be made without departing from the spirit of the invention. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range is specifically disclosed. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

What is claimed is:

1. A method comprising:
providing a device containing a carbon nanomaterial in a first state;
    wherein the carbon nanomaterial in the first state is used to produce a normal operational output of the device;
applying an input stimulus to the carbon nanomaterial so as to change the first state into a second state;
    wherein the input stimulus comprises an electrical pulse that alters the carbon nanomaterial from the first state, having a first resistance, into the second state, having a second resistance, the second state being maintained when the input stimulus is removed; and
    wherein the device continues operating when the carbon nanomaterial is in the second state but produces an altered operational output that is not indicative of a true operational state of the device; and
restoring the first state to the carbon nanomaterial by applying an electrical pulse of different magnitude to the carbon nanomaterial.

2. The method of claim 1, wherein the carbon nanomaterial is selected from the group consisting of carbon nanotubes, graphene, and any combination thereof.

3. The method of claim 1, further comprising:
removing the input stimulus from the carbon nanomaterial.

4. The method of claim 1, wherein a difference between the first state and the second state of the carbon nanomaterial comprises a change in at least one property selected from the group consisting of thermal conductivity, electrical conductivity, index of refraction, and any combination thereof.

5. The method of claim 1, wherein a difference between the normal operational output and the altered operational output of the device comprises a change in at least one property selected from the group consisting of an electrical signal, a thermal signal, an optical signal, and any combination thereof.

6. The method of claim 1, wherein the device further comprises molecules associated with the carbon nanomaterial;
    wherein the first state and the second state of the carbon nanomaterial results from association and dissociation of the molecules to and from the carbon nanomaterial.

7. The method of claim 6, wherein at least a portion of the molecules are not associated with the carbon nanomaterial while the input stimulus is being applied; and
        wherein the molecules alter at least one of the electrical conductivity or the thermal conductivity of the carbon nanomaterial.

8. The method of claim 1, wherein the device further comprises a phase change material that is in electrical communication, thermal communication, or mechanical communication with the carbon nanomaterial.

9. The method of claim 1, wherein the device further comprises a carbon nanomaterial whose state remains constant.

10. The method of claim 1, further comprising:
detecting the altered operational output of the device.

11. A method comprising:
providing a device containing a carbon nanomaterial in a first state;
    wherein the carbon nanomaterial in the first state is used to produce a normal operational output of the device;
applying an input stimulus to the carbon nanomaterial so as to change the first state into a second state;
    wherein the device continues operating when the carbon nanomaterial is in the second state but produces an altered operational output that is not indicative of a true operational state of the device; and
removing the input stimulus from the carbon nanomaterial;
    wherein the carbon nonmaterial reverts to the first state when the input stimulus is removed;
    wherein the input stimulus is applied during an unauthorized use or investigation of the device; and
    wherein the altered operational output results in an improper functioning of the device.

12. A method comprising:
providing a device containing a carbon nanomaterial in a first state;
    wherein the carbon nanomaterial to the first state is used to produce a normal operational output of the device; and
applying an input stimulus to the carbon nanomaterial so as to change the first stale into a second state, the input stimulus comprising an electric field that alters the refractive index of the carbon nanomaterial;
    wherein the device continues operating when the carbon nanomaterial is in the second state but produces an altered operational output that is not indicative of a true operational state of the device; and
    wherein a difference between the first state and the second state of the carbon nanomaterial comprises a change in a wavelength of light being transmitted through the carbon nanomaterial.

13. A method comprising:
providing a device containing a carbon nanomaterial in a first state;
    wherein the carbon nanomaterial in the first state is used to produce a normal operational output of the device;
applying an input stimulus to the carbon nanomaterial in response to an unauthorized use or investigation of the device so as to change the carbon nanomaterial from the first state into a second state;
    wherein the device produces an altered operational output while the input stimulus is being applied, and the altered operational output results in improper functioning of the device; and
restoring the normal operational output of the device when the unauthorized use or investigation of the device ceases.

14. The method of claim 13, wherein the carbon nanomaterial is selected from the group consisting of carbon nanotubes, graphene, and any combination thereof.

15. The method of claim 13, wherein the input stimulus is selected from the group consisting of an electrical stimulus, a thermal stimulus, an optical stimulus, a mechanical stimulus, and any combination thereof.

16. The method of claim 13, wherein a difference between the first state and the second stale of the carbon nanomaterial comprises a change in at least one property selected from the group consisting of thermal conductivity, electrical conductivity, index of refraction, and any combination thereof.

17. The method of claim 13, wherein a difference between the normal operational output and the altered operational output of the device comprises a change in at least one property selected from the group consisting of an electrical signal, a thermal signal, an optical signal, and any combination thereof.

18. The method of claim 13, wherein the device further comprises molecules;
    wherein the molecules are associated with the carbon nanomaterial in the first state, and at least a portion of the molecules are dissociated from the carbon nanomaterial in the second state.

19. The method of claim 13, wherein the device further comprise a phase change material that is in electrical communication, thermal communication, or mechanical communication with the carbon nanomaterial;

wherein the first state and the second state of the carbon nanomaterial result from a change in the electrical conductivity or the thermal conductivity of the phase change material in response to the input stimulus.

20. The method of claim 13, wherein the input stimulus comprises an electrical pulse that alters the carbon nanomaterial from the first state, having a first resistance, into the second state, having a second resistance; and     wherein the normal operational state is restorable by applying an electrical pulse of different magnitude to the carbon nanomaterial.

21. The method of claim 13, wherein the input stimulus comprises an electric field that alters the refractive index of the carbon nanomaterial; and     wherein a difference between the first state and the second state of the carbon nanomaterial comprises a change in a wavelength of light being transmitted through the carbon nanomaterial.

22. The method of claim 13, wherein the device further comprises a carbon nanomaterial whose state remains constant.

23. A device comprising:

a carbon nanomaterial that is switchable between a first state and a second state;

wherein the first state produces a normal operational output of the device and the second state produces an altered operational output that is not indicative of a true operational state of the device; and     an input element for applying an input stimulus to the carbon nanomaterial, the input stimulus being operable to switch the carbon nanomaterial from the first state into the second state;

wherein the carbon nanomaterial assumes the second state only while the input stimulus is being applied.

24. The device of claim 23, wherein the altered operational output results in an improper functioning of the device.

25. The device of claim 23, wherein the input element is operable to apply the input stimulus in response to an unauthorized use or investigation of the device.

26. The device of claim 23, wherein the carbon nanomaterial is selected from the group consisting of carbon nanotubes, graphene, and any combination thereof.

27. The device of claim 23, further comprising:

a carbon nanomaterial whose state remains constant.

28. A method comprising:

providing a device containing a carbon nanomaterial in a first state;

wherein the carbon nanomaterial in the first state is used to produce a normal operational output of the device;

applying an input stimulus to the carbon nanomaterial so as to change the first state into a second state;

wherein the device continues operating when the carbon nanomaterial is in the second state but produces an altered operational output that is not indicative of a true operational state of the device; and     removing the input stimulus from the carbon nanomaterial;

wherein the carbon nanomaterial reverts to the first state when the input stimulus is removed.

29. The method of claim 28, wherein the input stimulus is applied during an unauthorized use or investigation of the device.

30. The method of claim 29, wherein the altered operational output results in an improper functioning of the device.

31. A method comprising:

providing a device containing a carbon nanomaterial in a first state;

wherein the carbon nanomaterial in the first state is used to produce a normal operational output of the device; and     applying an input stimulus to the carbon nanomaterial so as to change the first state into a second state;

wherein the device continues operating when the carbon nanomaterial is in the second state but produces an altered operational output that is not indicative of a true operational state of the device; and         wherein the carbon nanomaterial is irreversibly changed to the second state upon applying the input stimulus.

\* \* \* \* \*